US010551253B2

(12) United States Patent
Coughlan (10) Patent No.: US 10,551,253 B2
(45) Date of Patent: Feb. 4, 2020

(54) TEMPERATURE AND ANGULAR SPEED SENSING APPARATUS (71) Applicant: CUMMINS LTD, Huddersfield (GB)

(72) Inventor: Stephen Gerard Coughlan, Halifax (GB)

(73) Assignee: Cummins Ltd., Huddersfield (GB)

( * ) Notice: Subject to any disclaimer, the term of this patent is extended or adjusted under 35 U.S.C. 154(b) by 161 days.

(21) Appl. No.: 15/528,132

(22) PCT Filed: Nov. 19, 2015

(86) PCT No.: PCT/GB2015/053530
§ 371 (c)(1),
(2) Date: May 19, 2017

(87) PCT Pub. No.: WO2016/079524
PCT Pub. Date: May 26, 2016

(65) Prior Publication Data
US 2017/0328788 A1   Nov. 16, 2017

(30) Foreign Application Priority Data

Nov. 20, 2014 (GB) .................................. 1420615.5

(51) Int. Cl.
G01K 7/36 (2006.01)
F02C 6/12 (2006.01)

(52) U.S. Cl.
CPC . G01K 7/36 (2013.01); F02C 6/12 (2013.01)

(58) Field of Classification Search
CPC .............. G01K 7/36; G01K 13/08; F02C 6/12
See application file for complete search history.

(56) References Cited

U.S. PATENT DOCUMENTS

| 4,095,469 A | 6/1978 | Yamada et al. |
| 4,967,153 A | 10/1990 | Langley |
| 5,354,130 A * | 10/1994 | Seppa ...................... G01K 7/36 374/117 |

(Continued)

FOREIGN PATENT DOCUMENTS

| CN | 101918803 A | 12/2010 |
| DE | 4431045 A1 | 3/1996 |

(Continued)

OTHER PUBLICATIONS

International Search Report and Written Opinion issued by the European Patent Office, dated Jan. 27, 2016, for International Application No. PCT/GB2015/053530; 14 pages.

(Continued)

Primary Examiner — Lisa M Caputo
Assistant Examiner — Philip L Cotey
(74) Attorney, Agent, or Firm — Faegre Baker Daniels LLP (57) ABSTRACT

A sensing apparatus for a turbomachine comprises: a magnet; a sensing coil; a power supply; and a processor. The magnet is arranged to produce a magnetic field and the sensing coil is at least partially disposed in the magnetic field. The power supply is operable to provide a voltage across the sensing coil. The processor is operable to determine a periodicity of a voltage across the sensing coil. The processor is further operable to determine a quantity indicative of temperature dependent characteristic of the sensing coil.

24 Claims, 5 Drawing Sheets

(56) References Cited

U.S. PATENT DOCUMENTS

| | | | |
|---|---|---|---|
| 5,801,359 A * | 9/1998 | Mano | G01K 7/00 219/618 |
| 6,074,088 A | 6/2000 | Oberschmid et al. | |
| 6,134,889 A * | 10/2000 | Markyvech | F02D 23/00 60/602 |
| 6,927,567 B1 * | 8/2005 | Roeseler | F01D 17/06 324/207.25 |
| 7,023,205 B1 | 4/2006 | Krupp | |
| 7,170,284 B2 * | 1/2007 | Roeseler | F01D 17/06 324/207.25 |
| 7,173,411 B1 * | 2/2007 | Pond | H03K 17/9502 324/207.12 |
| 7,372,253 B2 | 5/2008 | Biber et al. | |
| 7,552,810 B2 * | 6/2009 | Mecklenburg | G07D 3/121 194/317 |
| 7,612,557 B2 * | 11/2009 | Shimomura | G01V 3/102 324/207.12 |
| 8,018,225 B2 | 9/2011 | Weickert | |
| 8,801,280 B2 | 8/2014 | Yoshimura et al. | |
| 2005/0280412 A1 * | 12/2005 | Roeseler | F01D 17/06 324/228 |
| 2007/0129908 A1 * | 6/2007 | Adam | G01K 13/08 702/130 |
| 2007/0200562 A1 * | 8/2007 | Shimomura | G01V 3/102 324/222 |
| 2007/0246942 A1 * | 10/2007 | Stahlhut | F01N 5/04 290/40 A |
| 2009/0257470 A1 | 10/2009 | Giors et al. | |
| 2010/0213929 A1 * | 8/2010 | Gregg | F01D 11/20 324/207.15 |
| 2010/0258099 A1 * | 10/2010 | Andersson | F02D 31/006 123/676 |
| 2010/0313855 A1 | 12/2010 | Kassner | |
| 2012/0206850 A1 * | 8/2012 | Takeuchi | B62M 6/50 361/153 |
| 2013/0336362 A1 * | 12/2013 | Onishi | G01K 13/00 374/184 |
| 2014/0130506 A1 * | 5/2014 | Gale | F02C 6/12 60/773 |
| 2014/0366632 A1 * | 12/2014 | Lerchenmueller | F01D 17/06 73/509 |
| 2016/0149527 A1 * | 5/2016 | Frampton | H02P 9/00 322/17 |
| 2016/0187366 A1 * | 6/2016 | Tuor | F01D 17/06 415/118 |

FOREIGN PATENT DOCUMENTS

| | | |
|---|---|---|
| GB | 1359574 A | 7/1974 |
| JP | S57122326 A | 7/1982 |
| JP | S59108960 A | 6/1984 |
| WO | WO2004027433 A1 | 4/2004 |
| WO | WO2011106825 A2 | 9/2011 |

OTHER PUBLICATIONS

Examination report issued by the United Kingdom Intellectual Property office, dated May 18, 2015, for related Application No. GB1420615.5; 4 pages.

Summary of the Second Office Action, Application No. 201580073652.0, dated Aug. 30, 2019; 3 pages.

Second Office Action issued by the Chinese Patent Office, dated Aug. 30, 2019 for Chinese Application No. 201580073652.0; 10 pages.

* cited by examiner

TEMPERATURE AND ANGULAR SPEED SENSING APPARATUS

The present invention relates to a sensing apparatus for determining an operating temperature of a rotating body. The sensing apparatus may be particularly suited for use with a turbomachine such as, for example, a turbocharger.

Turbochargers are well known devices for supplying air to the intake of an internal combustion engine at pressures above atmospheric (boost pressures). A conventional turbocharger comprises an exhaust gas driven turbine wheel mounted on a rotatable shaft within a turbine housing. Rotation of the turbine wheel rotates a compressor wheel mounted on the other end of the shaft within a compressor housing. The shaft is supported by a bearing disposed between the turbine housing and the compressor housing. The bearing may be disposed within a bearing housing and may be supplied with a lubricant such as, for example, oil. The compressor wheel delivers compressed air to the intake manifold of the engine, thereby increasing engine power.

It is known to provide a turbomachine with sensors to measure operating characteristics of the turbomachine. Any such operational information can be used as one parameter of a turbomachine control system. For instance, by providing information concerning the angular speed of a turbocharger to an engine control unit (ECU) it may be possible to prevent or counteract any turbocharger over speeding. The engine control unit (also commonly referred to as an Engine Management System or Engine Control Module) may receive a number of input signals from various system sensors, and controls the running of the engine in response to those signals. This is particularly important in engine systems that use exhaust gas recirculation (EGR) in which controlled amounts of exhaust gas are supplied to the intake manifold of the engine. In such engine systems the angular speed of the turbocharger is controlled carefully to ensure that the exhaust pressure is greater than that at the compressor intake, whilst not exceeding the operating limits of turbocharger angular speed.

It may be desirable to know the temperature of parts of a turbocharger. For example, may be desirable to know the temperature of a lubricant within the bearing housing. Additionally or alternatively, it may be desirable to know the outlet temperature of compressed air delivered by the compressor wheel to the intake manifold of the engine.

The provision of additional sensors on a turbocharger, for example to determine the temperature of parts of a turbocharger, can be challenging for a number of reasons. First, for many parts of the turbocharger, there is limited space for the provision of such additional sensors. Second, the provision of sensors at some parts of the turbocharger may have a detrimental effect on its performance and therefore it may be desirable to limit the number of sensors provided. Third, some interior parts of a turbocharger operate under harsh environments, which are subject to high temperatures and pressures as well as significant vibration. Such environments are not suitable for many sensors. Further, some sensors may produce unreliable or unclear output signals in such harsh environments as a result of interference and noise.

It is an object of embodiments of the present invention to provide a sensing apparatus that at least partially addresses one or more problems or disadvantages present in the prior art, whether identified herein or elsewhere.

According to a first aspect of the invention there is provided a sensing apparatus, comprising: a magnet arranged to produce a magnetic field; a sensing coil at least partially disposed in the magnetic field; a power supply operable to provide a voltage across the sensing coil; and a processor operable to determine a periodicity of a voltage across the sensing coil, wherein the processor is further operable to determine a quantity indicative of temperature dependent characteristic of the sensing coil.

Such a sensing apparatus can be used to determine both the angular speed of a rotating object, such as a shaft or a turbine wheel, and temperature in the vicinity of said rotating object, as now described.

To determine the angular speed of a rotating object, the sensing apparatus may be used as a conventional variable reluctance sensor or an eddy current sensor, both of which are known in the art. That is, the processor may be further operable to determine an angular speed from the determined periodicity of the voltage across the sensing coil. In use, the sensing apparatus is arranged such that the rotating object rotates through the magnetic field of the magnet. If the object does not have continuous rotational symmetry about its axis of rotation then as the object moves through the magnetic field it distorts the magnetic field. This causes a change in the amount of magnetic flux linking the sensing coil and an electromotive force is therefore induced in the sensing coil. The induced electromotive force will be periodic, with a frequency equal to that of the rotating object.

The quantity indicative of a temperature dependent characteristic of the sensing coil may be used to determine the temperature in the vicinity of the rotating object.

Advantageously, the first aspect of the invention provides a single sensing apparatus that can determine two variables substantially simultaneously. Relative to a known conventional variable reluctance sensor or an eddy current sensor, no additional sensing elements (for example a thermocouple or similar) are required. Therefore, the first aspect provides a compact arrangement that reduces the number of sensors required to determine the two variables (angular speed and temperature).

The temperature dependent characteristic of the sensing coil may be the impedance of the sensing coil.

In some embodiments the voltage provided across the sensing coil by the power supply may be substantially constant (i.e. direct current). In other embodiments the voltage provided across the sensing coil by the power supply may be periodic (i.e. alternating current). For example, the voltage signal may be a square wave or a sinusoidal signal. A square wave signal may be preferable because it may be easier to generate than a sinusoidal signal using digital electronics.

The sensing apparatus may comprise a memory. The memory may be integral with, or separate from, the processor. The processor may be operable to write to and/or read from the memory.

The sensing apparatus may comprise a plurality of different operating modes. The sensing apparatus may comprise a mode selection mechanism that may allow one of the plurality of different operating modes to be selected. For this purpose, the sensing apparatus may be provided with a user interface. The voltage provided across the sensing coil by the power supply may differ for different operating modes. Additionally or alternatively, the quantity indicative of the temperature dependent characteristic of the sensing coil may differ for different operating modes.

In one embodiment, the sensing apparatus comprises a first operating mode and a second operating mode. In the first operating mode, the voltage provided across the sensing coil by the power supply may be substantially constant. In the second operating mode the voltage provided across the sensing coil by the power supply may be periodic.

In the first operating mode, the sensing coil may be suitable for determining the angular speed and an operating temperature of a rotating object comprising a first portion with a generally constant radius and second portion with a non-uniform radius. The radius of a rotating object at a point on its surface may be the perpendicular distance between that point and an axis of rotation of the object, i.e. the shortest distance between the point and the axis of rotation. In general, the radius of a rotating object may vary over its surface. The radius of a cylindrical object that rotates about its axis of symmetry is constant over its surface. An example of a rotating object comprising a first portion with a generally constant radius and second portion with a non-uniform radius is a generally cylindrical shaft that is provided with one or more features on its surface. For example, the shaft may be provided with a flat section on its surface. That is, in cross section the shaft may be of the form of a segment of a circle. The shaft may form part of a turbomachine such as, for example, a turbocharger.

In use, in the first operating mode, the sensing apparatus may be disposed adjacent to the rotating object. As the object rotates, the first and second portions will alternately sweep past the sensing apparatus. Since the second portion of the object has a non-uniform radius, while the second portion passes the sensing element, it will disturb the magnetic field, cause a change in the amount of magnetic flux linking the sensing coil and induce an electromotive force in the sensing coil. Therefore, in general, while the second portion passes the sensing element the voltage across the sensing coil will vary. Since the first portion of the object has a generally constant radius, while the first portion passes the sensing element, after an initial period during which the voltage stabilises, the voltage across the sensing coil will be substantially equal to the voltage provided by the power supply. The period during which the voltage across the sensing coil is substantially equal to the voltage provided by the power supply may be referred to as the measurement period.

In the first operating mode, since the voltage is substantially constant, during the measurement period the sensing coil may be said to be under direct current conditions. Under direct current conditions the sensing coil will behave as a pure resistance, i.e. the reactance of the sensing coil will have no effect on the current which flows through the sensing coil for a given voltage across it. Therefore, for such embodiments, the temperature dependent characteristic of the sensing coil may be the resistance of the sensing coil. The quantity indicative of the temperature dependent characteristic of the sensing coil may be a current flowing through the sensing coil. In one embodiment, the quantity indicative of the temperature dependent characteristic of the sensing coil may be a current flowing through the sensing coil during the measurement period.

In the second operating mode, the temperature dependent characteristic of the sensing coil may be the impedance of the sensing coil. Further, the quantity indicative of the temperature dependent characteristic of the sensing coil may be a resonant frequency of the sensing coil. Alternatively, the quantity indicative of the temperature dependent characteristic of the sensing coil may be a phase shift between a current flowing through the coil and the voltage.

In either operating mode, the processor may be operable to determine a temperature dependent characteristic of the sensing coil from the determined quantity indicative of said temperature dependent characteristic. For example, in the first operating mode, the processor may be operable to determine a resistance of the sensing coil from the voltage and the current determined during the measurement period.

Further, the processor may be operable to determine a temperature of the sensing coil from either: the temperature dependent characteristic, or directly from the determined quantity indicative of the temperature dependent characteristic. Said determination of the temperature of the sensing coil may be achieved by executing an algorithm. Alternatively, the determination of the temperature of the sensing coil may be achieved by accessing calibration data. The calibration data may be in the form of a lookup table and may be stored in the memory.

The processor may be operable to output a signal indicative of the temperature of the sensing coil. Additionally or alternatively, the processor may be operable to store the temperature of the sensing coil, or a quantity indicative thereof, in the memory.

The processor may be operable to sample the quantity indicative of the temperature dependent characteristic at any suitable rate. The processor may be arranged to sample the quantity indicative of the temperature dependent characteristic in dependence on a periodicity of the voltage across the sensing coil previously determined by the processor. For example, the processor may be operable to sample the quantity indicative of the temperature dependent characteristic once per cycle of the periodic voltage across the sensing coil.

The processor may be operable to determine at what point in its cycle the quantity indicative of the temperature dependent characteristic is sampled. For example, when operating in the first operating mode, the processor may be operable to sample the current flowing through the sensing coil at times when it expects the voltage across the sensing coil to be substantially constant, based on previous cycles.

The sensing coil may be formed from any suitable conductor. The sensing coil may be formed from a Ohmic material. For example, the sensing coil may be formed from copper. Copper offers a relatively good conductivity, is relatively cheap and can be easily formed into long, thin wires. Alternatively, the sensing coil may be formed from any other conductor such as, for example, gold, silver or steel. The resistance of the sensing coil may be dependent upon its length, which may depend on the number of turns of the sensing coil and the length of each turn. The resistance of the sensing coil may depend linearly upon its temperature. The sensing coil may have a temperature coefficient of around 0.3 $\Omega/K$.

The sensing coil may be provided with a ferromagnetic pole piece arranged to direct magnetic flux from the magnet through the sensing coil. The sensing coil may be coiled around the pole piece. Advantageously, this may act to concentrate magnetic flux through the sensing coil, resulting in an enhanced signal.

According to a second aspect of the invention there is provided a turbomachine comprising a sensing apparatus according to the first aspect of the invention, arranged to determine an angular speed of a rotating object that forms part of the turbomachine and a temperature in the vicinity of said rotating object.

The turbomachine may be a turbocharger. The turbocharger may comprise a shaft, a turbine wheel mounted at or close to one end of the shaft, and a compressor wheel mounted at or close to an opposite end of the shaft.

The rotating object may be formed from a magnetic material such as, for example, steel.

The rotating object may comprise a first portion with a generally constant radius and second portion with a non-uniform radius. For example, the rotating object may comprise a generally cylindrical shaft that is provided with one or more features on its surface. The one or more features may comprise a flat section on a surface of the shaft. That is, in cross section the shaft may be of the form of a segment of a circle.

The angular extent of the second portion may for example be around 5-20% of the circumference of the rotating object. In one embodiment, the angular extent of the second portion is around 20% of the circumference of the rotating object. With such an arrangement, in use, as the rotating object rotates 80% of the time the first portion is adjacent to the sensing apparatus and 20% of the time the second portion is adjacent to the sensing apparatus.

For such embodiments, the sensing apparatus may be configured to operate in the first operating mode, wherein the voltage provided across the sensing coil by the power supply is substantially constant.

Alternatively, the rotating object may comprise a compressor wheel of a turbocharger compressor. For such embodiments, the sensing apparatus may be configured to operate in the second operating mode, wherein the voltage provided across the sensing coil by the power supply is periodic.

For such embodiments, the determined temperature in the vicinity of the rotating object may be the temperature of air flowing past the compressor wheel. The processor may be further operable to convert the temperature of air flowing past the compressor wheel to an outlet temperature of the compressor.

According to a third aspect of the invention there is provided a control system for a turbomachine, the control system comprising:
 a main processor operable to control one or more operating parameters of the turbomachine; and
 a sensing apparatus according to the first aspect of the invention, arranged to determine an angular speed of a rotating object that forms part of the turbomachine and a temperature in the vicinity of the rotating object.

The processor of the sensing apparatus may be operable to output a first signal indicative of an angular speed of the rotating object to the main processor. The processor of the sensing apparatus may be operable to output a second signal indicative of a temperature in the vicinity of the rotating object to the main processor. The main processor may be operable to control at least one of the one or more operating parameters of the turbomachine in response to the first and/or second signals. For example, the main processor may be operable to stop operation of the turbomachine if the temperature in the vicinity of the rotating object lies outside of a safe operating range. In particular, the main processor may be operable to stop operation of the turbomachine if the temperature in the vicinity of the rotating object exceeds a maximum safe operating temperature.

According to a fourth aspect of the invention there is provided a method of determining a temperature in the vicinity of an object, the method comprising:
 providing a sensing coil;
 providing a voltage across the sensing coil;
 determining a quantity indicative of temperature dependent characteristic of the sensing coil; and
 using the determined quantity to determine the temperature in the vicinity of the object.

The sensing coil may form part of a conventional variable reluctance sensor or an eddy current sensor, both of which are known in the art. The object may form part of a turbomachine such as, for example, a turbocharger and, in use, may rotate about a rotation axis.

The method may further comprise determining a periodicity of a voltage across the sensing coil.

The quantity indicative of a temperature dependent characteristic of the sensing coil may be determined at any suitable rate. The rate at which the quantity indicative of the temperature dependent characteristic is sampled may be dependent upon a periodicity of the voltage across the sensing coil previously determined by the processor. For example, the quantity indicative of the temperature dependent characteristic may be sampled once per cycle of the voltage across the sensing coil.

The method may further comprise determining at what point in the cycle of the quantity it is sampled.

The temperature dependent characteristic of the sensing coil may be the impedance of the sensing coil.

The voltage provided across the sensing coil may be substantially constant (i.e. direct current). For such embodiments, the quantity indicative of the temperature dependent characteristic of the sensing coil may be a current flowing through the sensing coil. In one embodiment, the quantity indicative of the temperature dependent characteristic of the sensing coil is a current flowing through the sensing coil during a measurement period, the measurement period being a period during which the voltage across the sensing coil is substantially equal to the voltage provided by the power supply. Alternatively, the quantity indicative of the temperature dependent characteristic of the sensing coil may be a current flowing through the sensing coil outside of the measurement period.

Alternatively, the voltage provided across the sensing coil may be periodic (i.e. alternating current). For example, the voltage signal may be a square wave or a sinusoidal signal. A square wave signal may be preferable because it may be easier to generate than a sinusoidal signal using digital electronics. In such embodiments, the second the sensing coil may be said to be under alternating current conditions. For such embodiments, the temperature dependent characteristic of the sensing coil may be the impedance of the sensing coil.

For embodiments wherein the voltage provided across the sensing coil is periodic, the step of determining a quantity indicative of a temperature dependent characteristic of the sensing coil comprises a sub-step of monitoring a current flowing through the sensing coil during a time period. In particular, it may comprise a sub-step of monitoring a frequency component of the current flowing through the sensing coil with the same frequency as a component of the periodic voltage.

The step of determining a quantity indicative of a temperature dependent characteristic of the sensing coil may further comprise a sub-step of determining a resonant frequency of the sensing coil. This may be achieved by altering a frequency of a component of the voltage provided across the sensing coil until there is substantially no phase shift between the component of the voltage and a frequency component of the current flowing through the sensing coil with the same frequency.

Alternatively, the step of determining a quantity indicative of a temperature dependent characteristic of the sensing coil may further comprise a sub-step of determining a phase shift between a frequency component of the voltage and a frequency component of the current flowing through the sensing coil with the same frequency.

The object may be a tip of a compressor wheel of a turbocharger. The method may further comprise converting the determined temperature in the vicinity of the object to an outlet temperature of a compressor of the turbocharger. Such an arrangement allows for a more accurate estimate of the outlet temperature of the compressor than can be achieved, for example, by extrapolation from an inlet temperature of the compressor. This is because the temperature difference between the airflow past the tip of the compressor wheel and the airflow at an inlet manifold of the internal combustion engine is relatively insensitive to other operating parameters of the turbocharger such as, for example, the pressure of the airflow within the compressor. The conversion may use extrapolation. Less extrapolation is required than would be the case if the compressor outlet temperature were to be extrapolated from the compressor inlet temperature.

Various aspects and features of the invention set out above or below may be combined with various other aspects and features of the invention as will be readily apparent to the skilled person.

Embodiments of the present invention will now be described, by way of example only, with reference to the accompanying Figures, of which.

Figure 1:
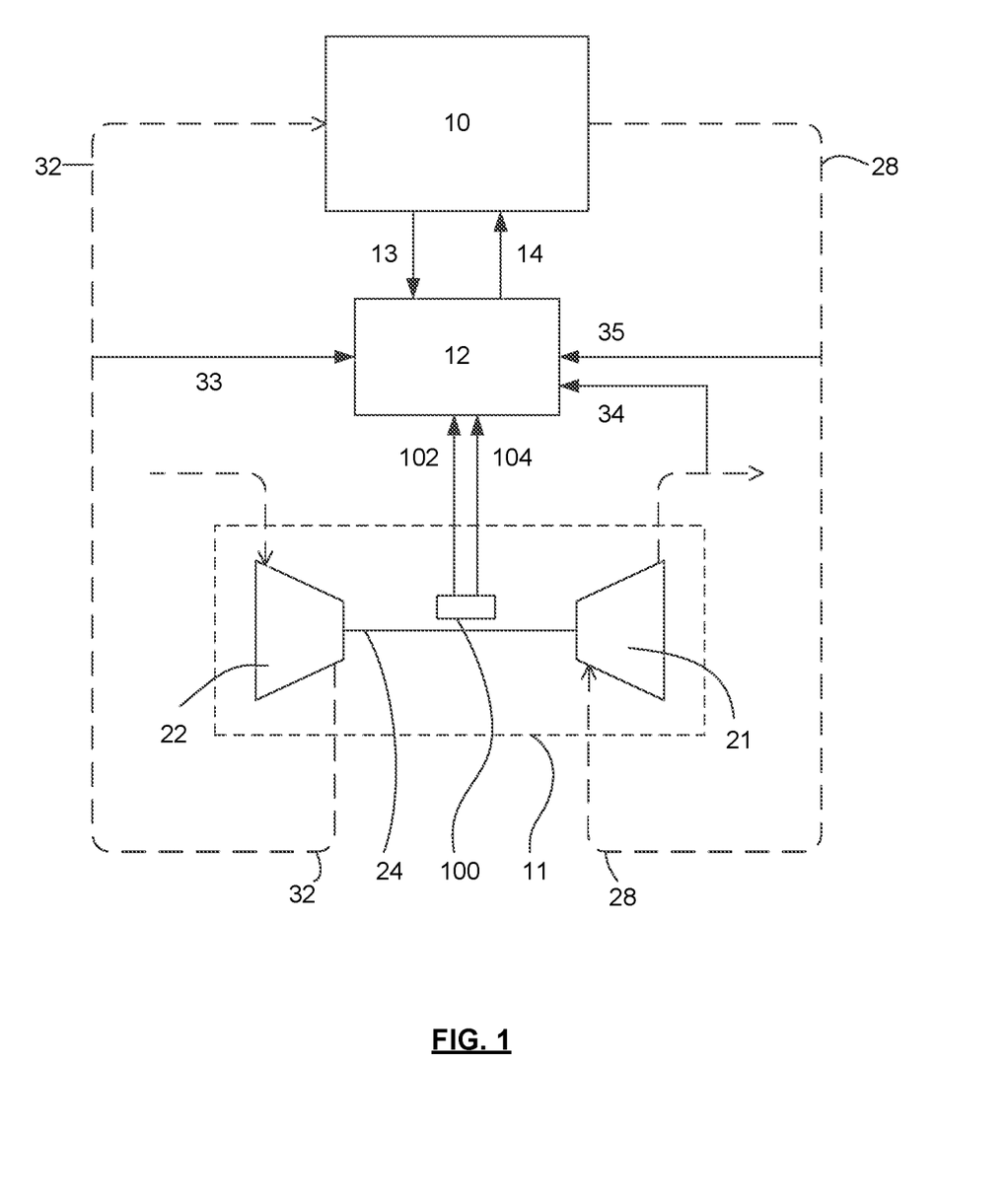
FIG. 1 is a block diagram showing an engine system incorporating a turbocharger having a sensing apparatus in accordance with an embodiment of the present invention.
Figure 2:
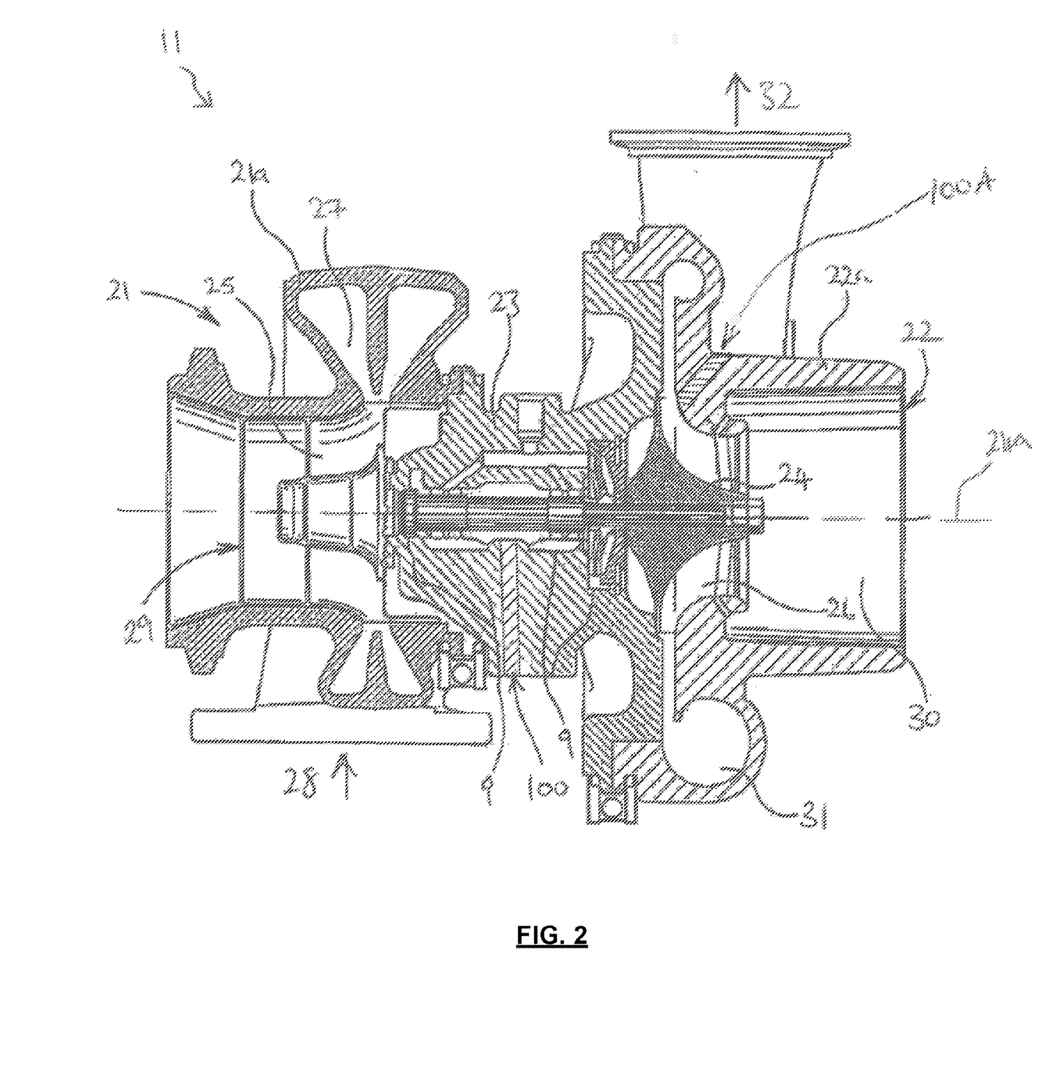
FIG. 2 is an axial cross-section through the turbocharger of FIG. 1, showing the sensing apparatus.

FIGS. 1 and 2 illustrate an internal combustion engine 10 and turbocharger 11 according to an embodiment of the invention. The operation of the internal combustion engine 10 is controlled by an engine control module (ECM) 12 that receives input signals 13 from a plurality of sensors disposed at suitable locations in the system, the signals containing information relating to the system performance. The ECM 12 is microprocessor-based and generates output control signals 14 that govern performance as is well known in the art.

The turbocharger 11 comprises a turbine 21 and a compressor 22 interconnected by a shaft 24. Shaft 24 extends from the turbine 21 to the compressor 22 through a bearing housing 23 and supports at one end a turbine wheel 25 for rotation within a turbine housing 21a and, at the other end, a compressor wheel 26 for rotation within a compressor housing 22a. In use, the shaft 24 rotates about turbocharger axis 24a on bearing assemblies 9 located in the bearing housing 23. The turbine housing 21a defines an inlet chamber 27 (typically a volute) to which exhaust gas 28 from the internal combustion engine 10 is delivered. The exhaust gas 28 flows from the inlet chamber 27 to an axially extending outlet passageway 29 via the turbine wheel 25 causing it to rotate. As a result, torque is transmitted by the shaft 24 to the compressor wheel 26. Rotation of the compressor wheel 26 within the compressor housing 22a pressurises ambient air drawn in through an air inlet 30 and delivers the pressurised air to an air outlet volute 31 from where it is fed to an inlet manifold of the internal combustion engine 10 as indicated by line 32 in FIG. 1 and arrow 32 in FIG. 2. The speed of the turbine wheel 25 is dependent upon the velocity of the gas passing from the inlet chamber 27 to the outlet passageway 29 and governs the speed of rotation of the compressor wheel 26.

As mentioned above the ECM 12 receives signals not only from the internal combustion engine 10 but also from several sensors elsewhere the system. For example, and as shown in FIG. 1, a pressure or volumetric flow rate signal 33 may be received from a sensor associated with the compressor outlet/engine intake manifold, a similar signal 34 from the turbine outlet recirculation and a similar signal 35 from the turbine inlet or engine exhaust 28.

Furthermore, turbocharger 11 comprises a sensing apparatus 100 according to an embodiment of the invention. Sensing apparatus 100 is associated with the shaft 24 within the bearing housing 23 and is operable to output: (a) an angular speed signal 102, which is indicative of the angular speed of the shaft 24; and (b) a temperature signal 104, which is indicative of a temperature within the bearing housing 23. The angular speed signal 102 and the temperature signal 104 are both received by the ECM 12.

It will be appreciated that the above described signals 33, 34, 35, 102, 104 are shown for illustrative purposes only and do not represent an exhaustive or essential list of possible parameters that may be monitored by the ECM 12.

Figure 3:
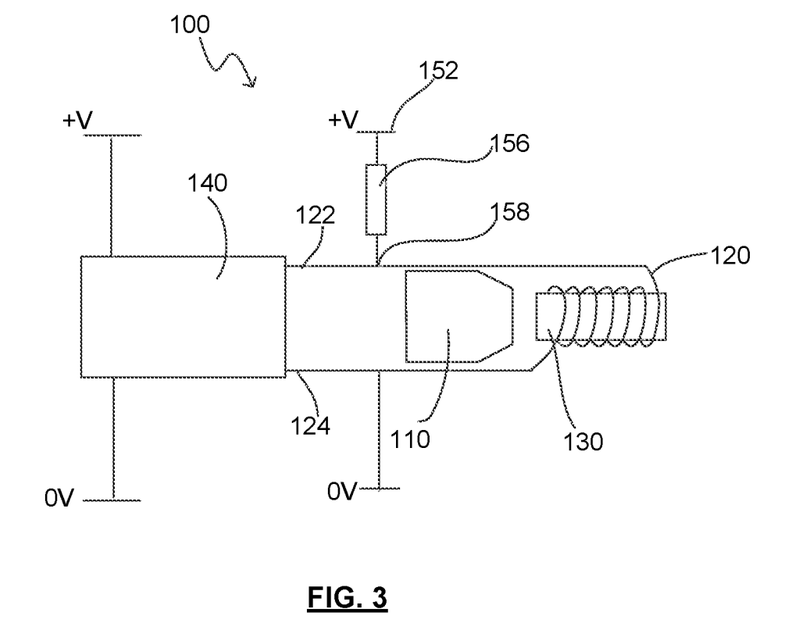
FIG. 3 is a schematic illustration of the sensing apparatus shown in FIGS. 1 and 2.

FIG. 3 illustrates the sensing apparatus 100 schematically. Structurally, the sensing apparatus 100 is of the form of a conventional variable reluctance sensor or an eddy current sensor, comprising: a magnet 110 arranged to produce a magnetic field; and a sensing coil 120 at least partially disposed in the magnetic field.

The magnet 110 may be a permanent magnet, formed from a ferromagnetic material. For example, the magnet 110 may be a rare-earth magnet, such as a neodymium magnet or a samarium-cobalt magnet, which magnets are known to produce relatively strong magnetic fields.

The sensing coil 120 comprises a coil of copper wire which is wound around a pole piece 130 (also known as a "core" or a "yoke") formed from a material with a high magnetic permeability. The pole piece acts to direct magnetic flux of the magnet 110 through the sensing coil 120. This concentrates the magnetic field in the region of the sensing coil 120 and increases the amount of magnetic flux linking the sensing coil 120.

The sensing apparatus 100 further comprises a processor 140, which may be microprocessor-based. Two ends 122, 124 of sensing coil 120 are connected to the processor 140.

The sensing apparatus 100 further comprises a power supply operable to provide a voltage across the sensing coil. For example, one end 122 of sensing coil 120 may be connected to a biasing voltage 152 via a resistor 156 and the other end 124 of the sensing coil 120 may be connected to ground. The voltage 158 of end 122 is determined by: the biasing voltage 152, the resistance of resistor 156 and the impedance of sensing coil 120. The power supply may be common to the sensing coil 120 and the processor 140. In some embodiments, the processor 140 may be operable to control biasing voltage 152. In a first embodiment, the voltage 158 provided across the sensing coil 120 is substantially constant.

Such a sensing apparatus 100 can be used to determine both the angular speed and of a rotating object, such as the shaft 24 or the compressor wheel 22 of turbocharger 11, and a temperature in the vicinity of that rotating object, as now described.

Figure 4:
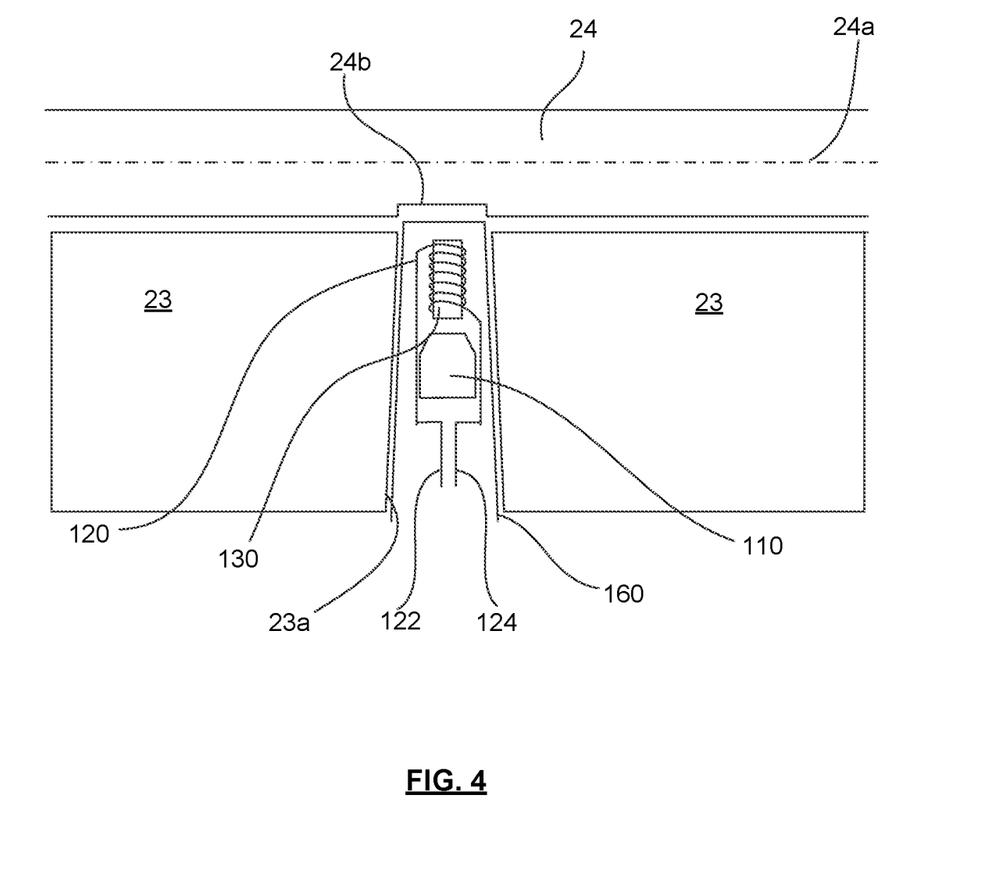
FIG. 4 is an enlarged portion of the axial cross-section through the turbocharger shown in FIG. 2.

Referring now to FIGS. 2 and 4, the sensing apparatus 100 comprises a housing 160, which is arranged to engage with a bore 23a in the bearing housing 23 of turbocharger 11. For example, the housing 160 may be provided with an external thread, which may cooperate with an internal thread within the bore 23a. A seal (not shown), such as an o-ring, may be provided between the housing 160 and the bearing housing 23. The housing 160 contains the magnet 110, sensing coil 120 and pole piece 130 of the sensing apparatus 100. The processor 140 and power supply may be provided separate from the housing 160.

Figure 5:
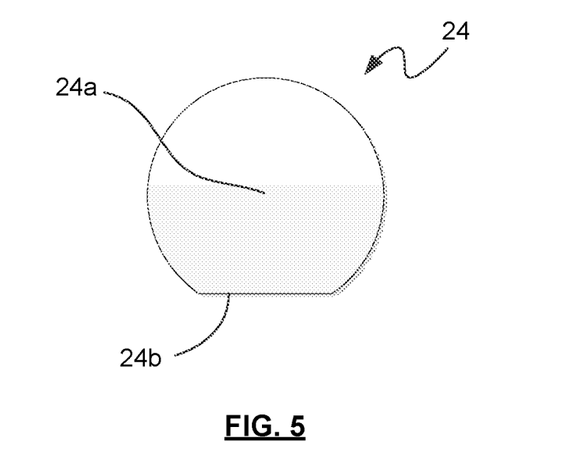
FIG. 5 is a cross-sectional view of the shaft of the turbocharger shown in FIG. 2 in a plane perpendicular to its axis.

When the housing 160 is received with bore 23a, the magnet 110, sensing coil 120 and pole piece 130 of the sensing apparatus 100 are disposed adjacent to the shaft 24 of turbocharger 11. In particular, they are adjacent to a section of the shaft 24 that lies between the two bearing assemblies 9 located in the bearing housing 23 which support the shaft 24. The section of the shaft 24 which is adjacent to the magnet 110, sensing coil 120 and pole piece 130 of the sensing apparatus 100 is generally cylindrical but is provided with a flat section 24b on its surface. That is, as shown in FIG. 5, in cross section the shaft 24 is of the form of a major segment of a circle. Therefore, the shaft 24 comprises a curved portion with a generally constant radius and portion with a non-uniform radius, formed by flat section 24b. The radius of shaft 24 at a point on its surface may be considered to be the perpendicular distance between that point and axis 24a.

The angular extent of the flat section 24b may be around 20% of the circumference of the shaft 24. Therefore, in use, as the shaft 24 rotates about axis 24a, for 20% of the time the flat section 24b is adjacent to the sensing apparatus.

The magnetic field of magnet 110 is directed through the sensing coil 120 by the pole piece 130, extends partially through the shaft 24 and returns to the magnet 110 via the bearing housing 23 and housing 160. Therefore, magnet 110, sensing coil 120 pole piece 130, shaft 24, bearing housing 23 and housing 160 may be considered to form a magnetic circuit. In principle, all of the elements of this magnetic circuit may affect the impedance of the sensing coil 120.

In use, as turbocharger 11 operates, shaft 24 rotates about its axis 24a and moves through the magnetic field of magnet 110. Due to the flat section 24b, the radius of the shaft 24 is not constant and therefore the shaft 24 does not have continuous rotational symmetry about axis 24a. As a result, as shaft 24 moves through the magnetic field of magnet 110, the properties of the magnetic circuit vary periodically and the shaft 24 therefore distorts the magnetic field periodically. This causes a change in the amount of magnetic flux linking the sensing coil 120 and an electromotive force is therefore induced in the sensing coil 120. The induced electromotive force is periodic, with a frequency equal to that of rotating shaft 24.

Figure 6:
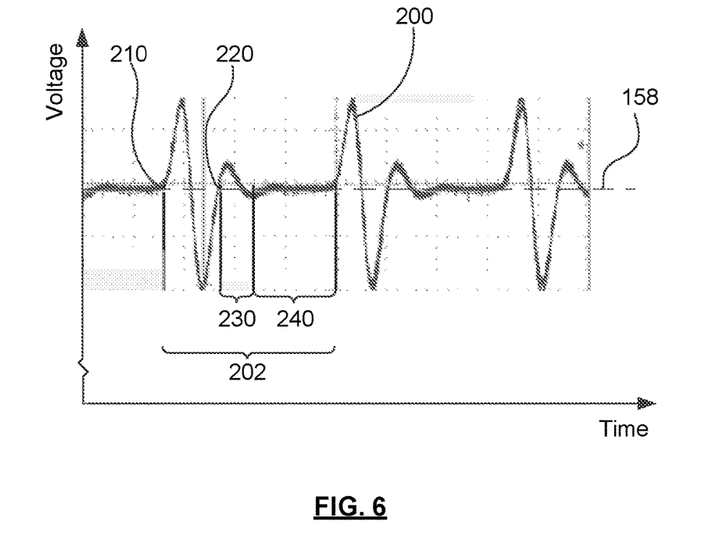
FIG. 6 shows a curve of the voltage across the sensing coil of the sensing apparatus shown in FIGS. 1 to 4 as a function of time.

This is illustrated in FIG. 6, which shows a curve 200 of the voltage across sensing coil 120 as a function of time. Curve 200 is periodic, with a time period 202 equal to that of the rotation of shaft 24.

As shaft 24 rotates, the curved and flat portions of the shaft will alternately sweep past the sensing apparatus 100. Since the flat section 24b of the shaft 24 has a non-uniform radius, while the flat portion passes the sensing coil 120, it will disturb the magnetic field, cause a change in the amount of magnetic flux linking the sensing coil 120 and induce an electromotive force in the sensing coil. Therefore, as a leading edge of the flat portion passes the sensing coil 120, the voltage across the sensing coil 120 starts to vary (as indicated by 210 in FIG. 6). While the flat portion passes the sensing coil 120, the voltage across the sensing coil 120 oscillates about the voltage 158 provided by the power supply. The peak amplitude of the voltage across the sensing coil 120 is dependent upon the rate of change of magnetic flux linking the sensing coil 120. In particular, the peak amplitude of the voltage across the sensing coil 120 varies linearly with the angular speed of the shaft 24. After a trailing edge of the flat portion passes the sensing coil 120 (indicated by 220 in FIG. 6), the voltage across the sensing coil 120 will continue to vary but after an initial period (indicated by 230 in FIG. 6), the voltage will stabilise. Following the initial period 230, the voltage across the sensing coil 120 will be substantially equal to the voltage 158 provided by the power supply until the leading edge of the flat portion passes the sensing coil 120 again. The period during which the voltage across the sensing coil is substantially equal to the voltage provided by the power supply will be referred to as the measurement period 240.

Processor 140 is operable to determine a periodicity of a voltage across the sensing coil 120, in a known manner, and to output the angular speed signal 102, which is received by the ECM 12. From the determined periodicity of the voltage across the sensing coil 120, the angular speed of the shaft 24 can be determined. The angular speed may be determined by the processor 140 or, alternatively, by ECM 12.

In accordance with an embodiment of the invention, the processor 140 is further operable to determine a quantity indicative of a temperature dependent characteristic of the sensing coil 120, as now described.

The temperature dependent characteristic of the sensing coil 120 may be the impedance of the sensing coil 120. In general, the impedance of the sensing coil may be represented by a complex number comprising a real component (resistance) and an imaginary component (reactance). Equivalently, the impedance may be represented by a magnitude (which represents the ratio of the voltage across the sensing coil to the current flowing through it) and a phase angle (which represents the phase shift by which the current lags the voltage). In general, under alternating current conditions, the reactance of the sensing coil is dependent upon the frequency of the voltage across the sensing coil.

Since the voltage 158 provided across the sensing coil 120 is substantially constant, during the measurement period 240 the sensing coil 120 may be said to be under direct current conditions. Under such direct current conditions the sensing coil 120 will behave as a pure resistance, i.e. the reactance of the sensing coil 120 will have no effect on the current which flows through the sensing coil 120 for a given voltage across it. Therefore, the temperature dependent characteristic of the sensing coil 120 that is determined by the processor 140 is the resistance of the sensing coil.

The sensing coil 120 may be an Ohmic conductor (for example copper) and therefore the resistance of the sensing coil 120 may be given by the ratio of the voltage across it to the current flowing through it. Thus, for a constant voltage 158 across the sensing coil 120 (during the measurement period 240) the current flowing through the sensing coil 120 is a quantity indicative of the resistance of the sensing coil 120. The current flowing through the sensing coil 120 during measurement period 240 can therefore be used to determine the temperature of the sensing coil 120, which is in the vicinity of the shaft 24.

The temperature of the sensing coil 120 will be related to an operating temperature within the bearing housing 23.

This operating temperature will be indicative of the temperature of the shaft 24, the bearing housing 23, bearing assemblies 9 and lubricant (for example oil) within the bearing housing 23. It can therefore be used to yield information relating to operation of the turbocharger such as, for example, failure of the bearing assemblies 9, degradation of lubricant within the bearing housing 23. Further, the combination of the operating temperature and the angular speed of the shaft 24 may yield further information relating to operation of the turbocharger 11. For example, if the operating temperature is above a desired maximum temperature then this may be indicative of a fault within the bearing housing. If the operating temperature within the bearing housing 23 is correlated with the angular speed of the shaft 24 then this may indicate that the fault is related to one or more of the bearing assemblies 9. Alternatively, if the operating temperature within the bearing housing 23 undergoes a step change and is not correlated with the angular speed of the shaft 24 then this may indicate that the fault is related to a gas leak through the bearing housing 23.

In an alternative embodiment, the current flowing through the sensing coil 120 outside of the measurement period 240 may be used to determine the temperature of the sensing coil 120. However, it will be appreciated that it may be mathematically more complicated, and therefore slower, to determine the temperature using such data from outside the measurement period.

The sensing apparatus comprises a memory (not shown) that processor 140 is operable to write to and/or read from. The memory may be integral with, or separate from, the processor 140.

It is known that the resistance of a conductor is dependent upon temperature. Calibration data which allows a mapping of a measured resistance to a corresponding temperature may be stored in the memory as a look-up table that is accessible by the processor 140. The resistance of the sensing coil 120 may depend linearly upon its temperature, at least over an operational temperature range in the vicinity of the shaft 24. The resistance of the sensing coil 120 and its calibration data may be dependent upon its length. The length of the sensing coil 120 may depend on its number of turns and the length of each turn. The sensing coil 120 may have of the order of thousands of turns. The resistance, and therefore the temperature coefficient, of the sensing coil 120 may be dependent on its cross sectional area, its length and its resistivity. The sensing coil 120 may for example have a temperature coefficient of around 0.3 Ω/K.

Figure 7:
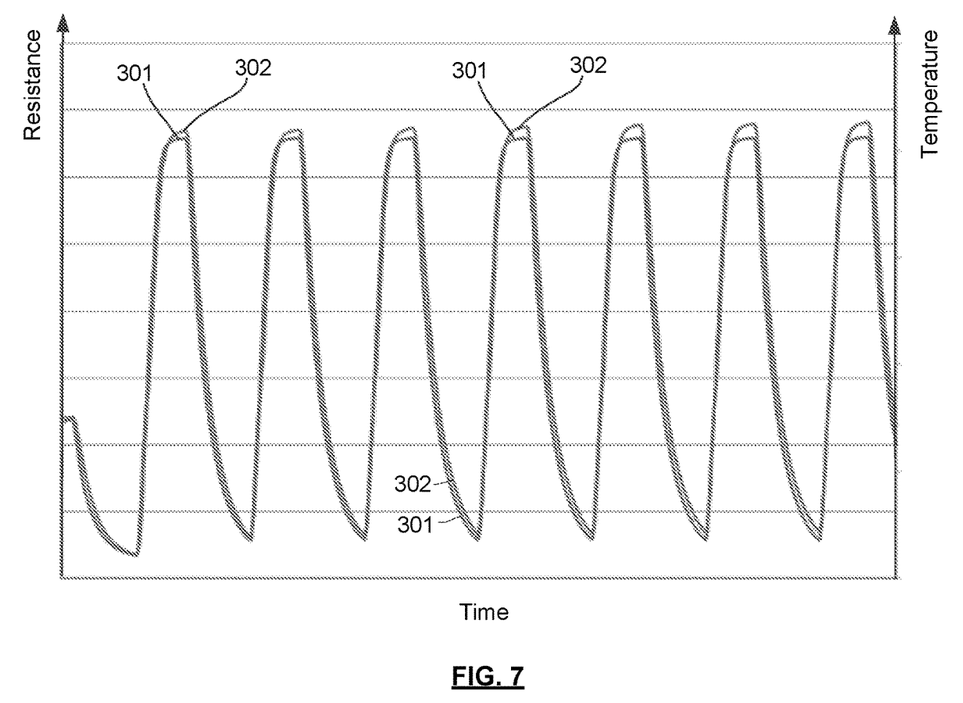
FIG. 7 shows, as a first curve, the resistance of the sensing coil of the sensing apparatus shown in FIGS. 1 to 4 as a function of time and, as a second curve, the temperature of the sensing coil as a function of time.

FIG. 7 shows, as a first curve 301, the resistance of a sensing coil 120 as a function of time and, as a second curve 302, the temperature of a sensing coil 120 as a function of time. It can be seen from FIG. 7 that there is a clear correlation between the resistance and the temperature of a sensing coil 120.

Each sensing apparatus 120 may be calibrated upon manufacture, and bespoke calibration data may be stored in its memory. Alternatively, a plurality of sensing apparatus 120 may be manufactured to a certain tolerance and average calibration data may be determined using a sample of the plurality of sensing apparatus 120. The average calibration data may be stored in the memory of each of the plurality of sensing apparatus 120.

Using calibration data stored as a look up table in the memory, the processor 140 is operable to determine the temperature of the sensing coil 120. The processor 140 may be operable to determine the temperature of the sensing coil 120 directly from the current flowing through the sensing coil 120 during measurement period 240. Alternatively, the processor 140 may be operable to determine the resistance of the sensing coil 120 from the voltage and the current determined during the measurement period 240. The processor 140 may be further operable to determine the temperature of the sensing coil 120 from this resistance.

The processor 140 of sensing apparatus 100 is further operable to output the measured temperature as temperature signal 104, which is received by the ECM 12 (see FIG. 1).

The processor 140 may be operable to sample the current flowing through the sensing coil 120 at any suitable rate. The rate at which the processor 140 samples the current flowing through the sensing coil 120 may be dependent upon a periodicity of the voltage across the sensing coil 120 previously determined by the processor 140. For example, the processor 140 may be operable to sample the current once per revolution of the shaft 24. The rate at which the processor 140 samples the current flowing through the sensing coil 120 may be determined by the ECM 12.

The current flowing through the sensing coil 120 is periodic, with a period determined by the angular speed of the shaft 24. The processor 140 may be operable to determine at what point in its cycle that the current is sampled. For example, the processor 140 may be operable to sample the current flowing through the sensing coil 120 at times when it expects the voltage across the sensing coil to be substantially equal to the voltage provided by the power supply, based on previous cycles. That is, the processor 140 may be operable to identify aspects of the shape of curve 200 and use this information to identify a suitable measurement period 240 for future measurements. Alternatively, the processor 140 may be operable to sample the current flowing through the sensing coil 120 at a predetermined point in the cycle of the current flowing through the sensing coil 120. For example, the processor 140 may be operable to sample the current flowing through the sensing coil 120 a predetermined time after the leading edge of the flat portion passes the sensing coil 120. The predetermined time may be a predetermined fraction of the period of the current flowing through the sensing coil 120. The predetermined point, predetermined time or predetermined fraction may be chosen in dependence on the geometry of the shaft 24 (for example the angular extent of the flat portion). For the embodiment of FIG. 6, the processor 140 may be operable to sample the current flowing through the sensing coil 120 more than around 0.5t after the leading edge of the flat portion passes the sensing coil 120, where t is the time period of the current flowing through the sensing coil 120.

In addition or as an alternative to outputting either or both of the angular speed signal 102 and the temperature signal 104 to the ECM 12, the processor 140 may be operable to sample the angular speed of the shaft 24 and/or the temperature of the sensing coil 120 (or a quantity indicative thereof) and store it, for example using a capacitor. This may be referred to a sample and hold mode.

Advantageously, sensing apparatus 100 provides a single sensing apparatus that can determine both the angular speed of shaft 24 and the temperature of the sensing coil 120 (which is in the vicinity of the shaft 24) substantially simultaneously. Relative to a known conventional variable reluctance sensor or an eddy current sensor, no additional sensing elements (for example a thermocouple or similar) are required. Therefore, sensing apparatus 100 provides a compact arrangement that reduces the number of sensors required to determine the two variables (angular speed and temperature).

In the exemplary embodiment described above, the sensing apparatus 100 according to an embodiment of the invention is used to determine a temperature in the vicinity of the shaft 24 of a turbocharger 11, in addition to its angular speed. However, in alternative embodiments, the sensing apparatus 100 may be used to determine the temperature in the vicinity of any rotating object that forms part of a turbomachine. For example, in an alternative embodiment, a sensing apparatus 100A may be used to determine the temperature of airflow past the compressor 22 of turbocharger 11. Sensing apparatus 100A may be substantially the same as sensing apparatus 100 described above, for example the current may be sampled in between the blades of the compressor wheel. Alternatively, the sensing apparatus 100A may be operable in accordance with a second embodiment of the invention, as now described.

In the second, alternative embodiment of the invention, the voltage 158 provided across the sensing coil is not substantially constant and is periodic. This may be achieved by varying potential 152. For example, the voltage signal 158 may be a square wave or a sinusoidal signal. A square wave signal may be preferable because it may be easier to generate than a sinusoidal signal using the digital electronics of processor 140. In the second operating mode, the sensing coil 120 may be said to be under alternating current conditions. Under alternating current conditions both the resistance and the reactance of the sensing coil 120 will affect the current which flows through the sensing coil for a given voltage across it.

The frequency of the voltage 158 provided across the sensing coil may be chosen so as keep emission of electromagnetic radiation within electromagnetic compatibility (EMC) standards. For example, the frequency of the voltage 158 provided across the sensing coil may be less than 50 kHz.

The impedance, in particular the reactance, of the sensing coil 120 is dependent upon the frequency of the voltage across the sensing coil. If a pure sinusoidal voltage is provided across the sensing coil 120 then the current flowing through the sensing coil will also be sinusoidal with the same frequency as the voltage. The amplitude and relative phase of the sinusoidal current will be dependent upon the impedance of the sensing coil for the frequency of the sinusoidal voltage. A square wave signal may be Fourier decomposed as a superposition of pure sinusoidal components, each component having a different frequency. If a square wave voltage is provided across the sensing coil 120 then the current flowing through the sensing coil will be dependent upon both the amplitudes of the different Fourier components within the square wave signal, and the impedance of the sensing coil for the frequency of each component.

The sensing coil 120 will have a resonant frequency at which the reactance is zero. At frequencies other than the resonant frequency, the reactance is non-zero and therefore the current flowing through the sensing coil will lag the voltage across it by a phase shift.

In the second embodiment, the temperature dependent characteristic of the sensing coil 120 is the impedance of the sensing coil and the quantity indicative of the impedance of the sensing coil 120 is either: a resonant frequency of the sensing coil 120; or a phase shift between a current flowing through the sensing coil 120 and the voltage.

The processor 140 is operable to monitor a current flowing through the sensing coil 120 during a time period. In particular, the processor 140 is operable to monitor a frequency component of the current flowing through the sensing coil 120 with the same frequency as a component of the periodic voltage. For example, for embodiments wherein the voltage provided by the power supply is a pure sinusoidal signal, the processor 140 is operable to monitor a frequency component of the current flowing through the sensing coil 120 that has the same frequency as the sinusoidal voltage signal. Alternatively, for embodiments wherein the voltage provided by the power supply is a square wave signal, the processor 140 is operable to monitor a frequency component of the current flowing through the sensing coil 120 that has the same frequency as one of the Fourier components of the voltage signal. For example, the processor 140 may monitor a frequency component of the current flowing through the sensing coil 120 that has the same frequency as a primary Fourier mode component of the voltage signal. In some embodiments, a plurality of Fourier mode components of the voltage signal is used. This may help to eliminate any effect that the signal generated by the rotation of the object (for example shaft 24a) has on the determined temperature.

For embodiments wherein a square wave voltage is provided across the sensing coil 120 then the sensing coil 120 and magnet 110 may act as a filter such that the current flowing through the sensing coil 120 is smoother, and more sinusoidal, than the input square wave voltage. Therefore, for such embodiments, the processor 140 may simply monitor the current flowing through the sensing coil 120. This avoids the use of filters (for example RC) to extract one or more different frequency components from the current flowing through the sensing coil 120. This may be beneficial since this reduces the number of components that must withstand the potentially harsh operating conditions that the sensing apparatus 100, 100A is subject to.

The processor 140 is operable to determine either: a resonant frequency of the sensing coil 120; or a phase shift between a current flowing through the sensing coil 120 and the voltage.

The resonant frequency of the sensing coil 120 may be determined by altering a frequency of a component of the voltage provided across the sensing coil 120 until there is substantially no phase shift between that component of the voltage and a frequency component of the current flowing through the sensing coil with the same frequency.

Advantageously, the second embodiment of the invention may be used to determine a temperature in the vicinity of a rotating object that does not have a sufficiently large smooth curved portion so as to allow the sensing coil to settle to direct current conditions for a portion of its period. This second embodiment of the invention may therefore be used to determine a temperature in the vicinity of any rotating object that forms part of turbocharger 11. For example, by placing the sensing apparatus close to the tip of the blades of a compressor wheel 26 in compressor 22 the second embodiment of the invention may be used to determine the temperature of airflow past the tip of the compressor wheel 26.

The temperature of airflow into the inlet manifold of the internal combustion engine 10 may be referred to as the outlet temperature of the compressor 22. The outlet temperature of the compressor 22 affects the combustion cycle of the engine 10 and therefore the level of pollutants in exhaust gases emitted by the engine 10. It is therefore desirable to know the outlet temperature of the compressor 22 so as to ensure that exhaust gases emitted by the engine 10 will meet emission standards. For example, the ECM 12 may be operable to compensate for changes in the outlet temperature of the compressor 22 by altering one or more parameters of engine 10 (via signals 14) so as to ensure that exhaust gases emitted by the engine 10 continue to meet emission standards.

One way of estimating the outlet temperature of the compressor 22 is to measure the inlet temperature of the compressor 22 and extrapolate the outlet temperature using a previously determined compressor map. A typical compressor inlet temperature may be around 50° C. and a typical compressor outlet temperature may be around 700-900° C. The temperature difference between the airflow past the tip of the compressor wheel and the airflow at the inlet manifold of the internal combustion engine 10 is significantly smaller than the temperature difference between the inlet of the compressor and the inlet manifold of the internal combustion engine 10. For example, a temperature difference between airflow past the tip of the compressor wheel 26 and at the outlet of the compressor 22 may be of the order of 10° C. Therefore a measurement of the temperature of airflow past the tip of the compressor wheel 26 may be converted into an outlet temperature of the compressor 22 using significantly less extrapolation.

In general, the compressor map, which describes how the temperature and pressure of airflow varies through the compressor 22 is dependent upon the ambient pressure at the inlet of the compressor 22. Different ambient pressures will result in different amounts of work being performed on the air by the compressor 22. As a result of this, for a given air temperature at the inlet of the compressor 22 different air temperatures will be seen at the outlet of the compressor 22 for different ambient air pressures. Therefore, if the ambient pressure is not measured, there is some uncertainty associated with any extrapolation from the airflow temperature at the inlet of the compressor 22 to the outlet temperature of the compressor 22. Airflow past the tip of the compressor wheel 26 has already been worked by the compressor wheel 26 and the airflow is not worked any further once it leaves the tip of the compressor wheel 26. Therefore, the temperature difference between the airflow past the tip of the compressor wheel 26 and the airflow at the inlet manifold of the internal combustion engine 10 does not depend on the pressure of the airflow. The temperature of airflow at tip of the compressor wheel 26 can therefore be converted to an airflow temperature at the outlet of the compressor 22 without any uncertainty arising from not knowing the pressure of the air. For this reason, a measurement of the temperature of airflow past the tip of the compressor wheel 26 allows for a more accurate conversion to the estimated outlet temperature of the compressor 22 than a conversion based on the compressor 22 inlet temperature. The conversion from tip airflow temperature to compressor outlet temperature may for example be an extrapolation.

Another advantage of the second embodiment arises from the fact that it is an active (rather than passive) measurement of the resonant frequency or the phase shift between a current flowing through the sensing coil 120 and the voltage. Because a signal is applied in order to obtain the measurement, the signal can be used as the basis for signal/noise discrimination. Therefore, the second embodiment is less susceptible to noise.

In a third embodiment, each sensing apparatus 100, 100A comprises a plurality of different operating modes and is provided with a mode selection mechanism (not shown) that may allow one of the plurality of different operating modes to be selected. In particular, the sensing apparatus may comprise a first operating mode and a second operating mode. In the first operating mode the processor 140 is arranged to operate as described above in connection with the first embodiment. In the second operating mode the processor 140 is arranged to operate as described above in connection with the second embodiment.

It will be appreciated that the term "processor" means any apparatus that is operable to receive input data, process that data according to a set of instructions and provide output data. Such a processor may, for example, be implemented as a microprocessor.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

One or more features of any of the above described embodiments may be combined with one or more features of any other of the above described embodiments.

While the invention has been illustrated and described in detail in the drawings and foregoing description, the same is to be considered as illustrative and not restrictive in character, it being understood that only the preferred embodiments have been shown and described and that all changes and modifications that come within the scope of the inventions as defined in the claims are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. For the avoidance of doubt, optional and/or preferred features as set out herein may be used either individually or in combination with each other where appropriate and particularly in the combinations as set out in the accompanying claims. The optional and/or preferred features for each aspect of the invention set out herein are also applicable to any other aspects of the invention, where appropriate.

The invention claimed is:

1. A sensing apparatus comprising:
a magnet arranged to produce a magnetic field;
a sensing coil at least partially disposed in the magnetic field;
a power supply configured to provide a voltage across the sensing coil, wherein the voltage provided across the sensing coil by the power supply is a periodic voltage which comprises a frequency component having a first frequency; and
a processor configured to determine a periodicity of a voltage across the sensing coil,
wherein the processor is further configured to monitor a frequency component of a current flowing through the sensing coil, with the frequency component of the current having a frequency which is the same as the first frequency, and to determine a quantity indicative of a temperature dependent characteristic of the sensing coil based upon the frequency component of the periodic voltage and the frequency component of the current.

2. The sensing apparatus of claim 1, wherein the temperature dependent characteristic of the sensing coil is the impedance of the sensing coil.

3. The sensing apparatus of claim 1, wherein the voltage provided across the sensing coil by the power supply is a square wave signal.

4. The sensing apparatus of claim 1, wherein the quantity indicative of the temperature dependent characteristic of the sensing coil is a resonant frequency of the sensing coil.

5. The sensing apparatus of claim 1, wherein the quantity indicative of the temperature dependent characteristic of the sensing coil is a phase shift between the current flowing through the coil and the voltage.

6. The sensing apparatus of claim 1, further comprising a memory, the processor being configured to write to and/or read from the memory.

7. The sensing apparatus of claim 6, wherein the processor is configured to store the temperature of the sensing coil, or a quantity indicative thereof, in the memory.

8. The sensing apparatus of claim 1, wherein the processor is configured to determine a temperature of the sensing coil using calibration data.

9. The sensing apparatus of claim 1, wherein the processor is configured to output a signal indicative of the temperature of the sensing coil.

10. The sensing apparatus of claim 1, wherein the processor is arranged to sample the quantity indicative of the temperature dependent characteristic at a rate dependent on a periodicity of the voltage across the sensing coil previously determined by the processor.

11. The sensing apparatus of claim 1, wherein the processor is configured to determine at what point in a cycle of the quantity indicative of the temperature dependent characteristic the quantity is to be sampled.

12. The sensing apparatus of claim 1, wherein the sensing coil is provided with a pole piece arranged to direct magnetic flux of the magnet through the sensing coil.

13. A turbomachine comprising a sensing apparatus as claimed in claim 1 arranged to determine an angular speed of a rotating object that forms part of the turbomachine and a temperature in the vicinity of said rotating object.

14. The turbomachine of claim 13, wherein the turbomachine comprises a turbocharger.

15. The turbomachine of claim 13, wherein the rotating object is formed from a magnetic material.

16. The turbomachine of claim 13, wherein the rotating object comprises a first portion with a generally constant radius and second portion with a non-uniform radius.

17. The turbomachine of claim 16, wherein the rotating object comprises a generally cylindrical shaft that is provided with a flat section on a surface of the shaft.

18. The turbomachine of claim 16, wherein the angular extent of the second portion forms between 5-20% of the circumference of the rotating object.

19. The turbomachine of claim 13, wherein the rotating object comprises a compressor wheel of a turbocharger compressor.

20. The turbomachine of claim 19, wherein the determined temperature in the vicinity of the rotating object is the temperature of air flowing past the compressor wheel and wherein the processor is further configured to convert the temperature of air flowing past the compressor wheel to an outlet temperature of the compressor.

21. A control system for a turbomachine, the control system comprising:
a main processor configured to control one or more operating parameters of the turbomachine; and
a sensing apparatus as claimed in claim 1, arranged to determine an angular speed of a rotating object that forms part of the turbomachine and a temperature in the vicinity of said rotating object.

22. The control system of claim 21, wherein the processor of the sensing apparatus is configured to output a signal indicative of the temperature in the vicinity of the rotating object to the main processor.

23. The control system of claim 22, wherein the main processor is configured to control at least one of the one or more operating parameters of the turbomachine in response to the signal.

24. The control system of claim 23, wherein the main processor is configured to stop operation of the turbomachine if the temperature in the vicinity of the rotating object lies outside of a safe operating range.

* * * * *